Patented Apr. 20, 1943

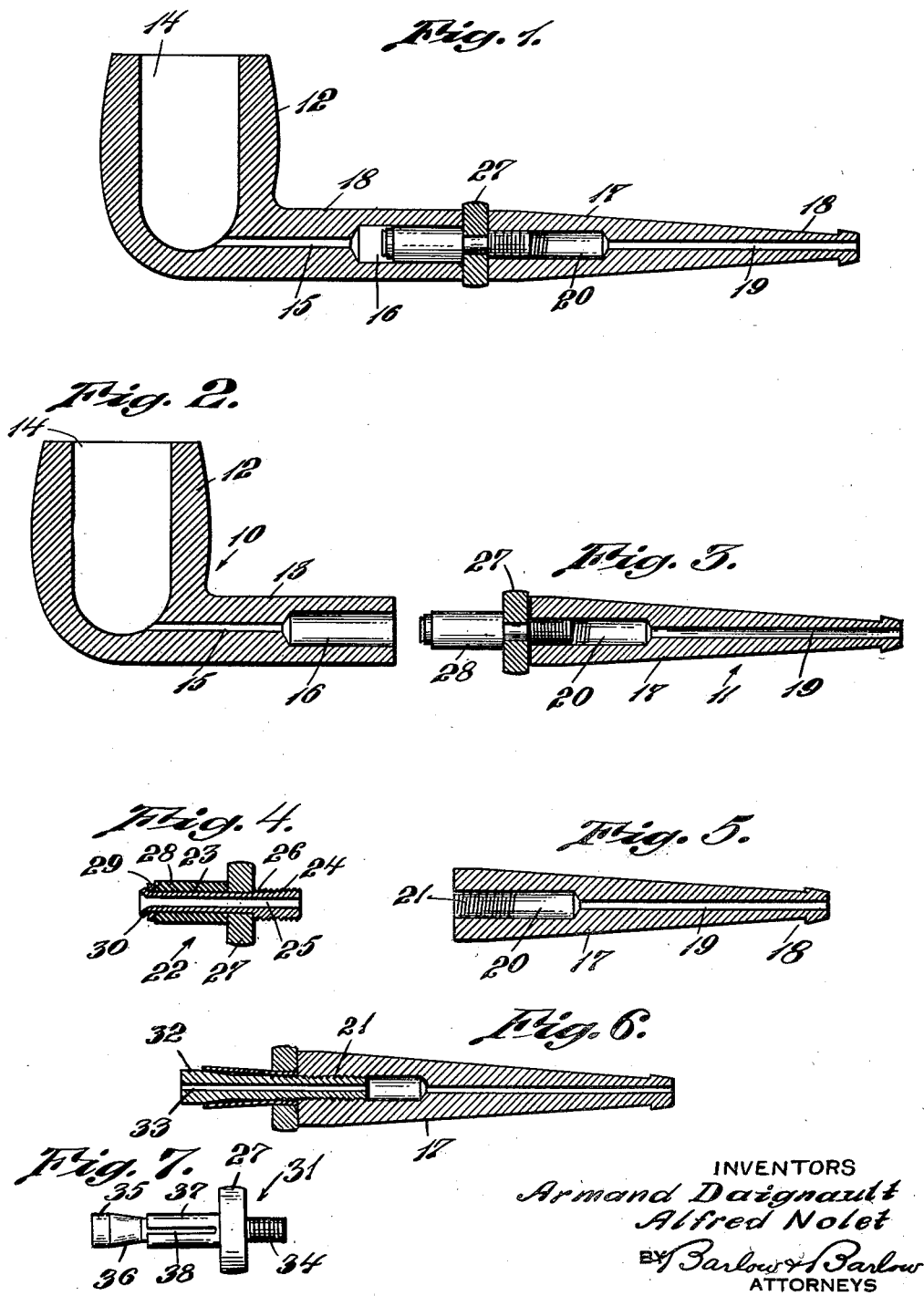

2,317,180

UNITED STATES PATENT OFFICE 2,317,180

PIPESTEM

Armand Daignault and Alfred Nolet,
Fall River, Mass.

Application November 28, 1941, Serial No. 420,830

2 Claims. (Cl. 131—225)

This invention relates to a pipe stem and particularly to such a pipe stem as may be used as a repair stem should the pipe stem initially supplied with the pipe break.

In the manufacture of a smoking pipe it is usual to provide two sections with a separation between a mouth piece stem and the shank of the pipe bowl for cleaning purposes. These two sections are joined together usually by an integral tenon turned down on the end of the rubber pipe stem which extends in an opening in the shank of the pipe bowl so as to have a tight fit therewith. Should the pipe stem break it is usual that the tenon breaks off in the bowl stem bore in which it tightly fits. To repair such a pipe due to the fact that a tight fit must be provided between the tenon of the pipe stem and the bore of the bowl shank the bowl section must be sent back to the factory that the pipe stem may be turned down to have an accurate and tight fit therewith for the proper securing relation between these two sections. It has been found impractical for handlers of pipes to try to carry in stock a sufficient number of pipe stems to fit all sizes of bowl shanks.

One of the objects of this invention is to provide a pipe stem which may be utilized to fit any bowl shank with which it is desired the same shall be assembled.

Another object of this invention is to provide a simple contained assembly of parts which by manipulation will serve to increase or decrease the size of the tenon of the pipe stem which fits into the bore of the pipe bowl shank.

Another object of this invention is to provide the holding parts concealed within the pipe stem so that they will not mar or in any way interfere with the appearance of the pipe, when the whole is assembled.

With these and other objects in view, the invention consists of certain novel features of construction, as will be more fully described and particularly pointed out in the appended claims.

In the accompanying drawing:

Fig. 1 is a sectional view of a pipe equipped with this invention.

Fig. 2 is a sectional view of the bowl section alone.

Fig. 3 is a sectional view of the pipe stem alone.

Fig. 4 is a sectional view of the tenon member of the pipe stem.

Fig. 5 is a sectional view of the pipe stem separated from the tenon member.

Fig. 6 is a sectional view of the pipe stem showing a tenon with a modified form of gripping device.

Fig. 7 is an elevational view of the modified tenon member.

In proceeding with this invention we provide an elastic tenon on the end of the pipe stem which may be inserted into the bore of the shank portion of the bowl and then expanded by turning of the pipe stem so that it will tightly fit within the bore of the shank of the bowl section. The reverse of these operations will permit the tenon to contract its diameter and permit the removal of the pipe stem from the bore of the shank of the bowl section.

With reference to the drawing, 10 designates the bowl section as shown in Fig. 2, and 11 designates the stem section as shown in Fig. 3 which when together form the complete pipe.

The bowl section 10 consists of a bowl portion 12 and a shank portion 13. The bowl is hollowed out as at 14 to provide for reception of tobacco, while the shank 13 has a bore 15 leading from the lower portion of the cavity 14, this bore being enlarged as at 16 at its end distant from the bowl. It is this bore portion 16 into which the tenon of the stem fits sufficiently tightly so as to keep the stem and the bowl section in assembled position when in use.

The stem section 11 consists of the mouth-piece portion 17 shaped at its end 18 to fit the mouth and provided with a bore 19 extending therethrough at the axial center thereof which is enlarged at its inner end as at 20 and threaded in the end of this enlargement as at 21. The tenon member, designated generally 22 and shown in Fig. 4, consists of a metal tube 23 having an enlarged threaded portion 24 at one end and provided with a bore 25 extending centrally therethrough. A shoulder 26 is provided between the threads and the remainder of the tube while a washer or bead 27 is readily rotatable upon the reduced portion of the tube and abuts the shoulder 26 adjacent the threads 24. An elastic sleeve 28 encircles the reduced portion of the member 23 and abuts at one end the bead or washer 27 while a smaller washer 29 engages the other end of this elastic sleeve 28 and is held in position by a heading up of the tube as at 30 to hold the sleeve and both washers in assembled position on the member. The washer or bead 27 will be a little larger than the outer diameter of the shank portion 18 or the inner end of the stem portion adjacent to the end of the shank, such as illustrated in Fig.

1, so that this washer or bead 27 will be slightly larger and easily grasped between the fingers.

When the tenon in its contracted position is inserted in the bore 16 by pushing these parts together in their relationship shown in Figs. 2 and 3 it is merely necessary to grasp the washer 27 and maintain enough pressure on the sleeve to prevent rotation and then turn the stem with relation to this washer to draw the threaded portion 24 of the tenon member further into the bore 20 which will draw the headed end of this member toward the washer and will longitudinally compress and laterally expand the rubber sleeve to thus increase its diameter and tightly grip the inner surface of the bore 16 of the shank of the bowl section.

By this arrangement considerable expansion may be had of the tenon and thus a large number of different size bores such as 16 may be gripped by the pipe stem so equipped. This makes it possible for any pipe merchant to carry in stock two or three sizes of pipe stems which will fit a large number of bores and thus the pipe smoker, should he break off the tenon or damage the stem sufficiently so that it must be replaced, may go to the retail merchant and purchase a stem which can be inserted into his pipe without the necessity of the pipe being shipped back to the manufacturer in order to get a tight and accurate fitting tenon for the bowl of the bowl shank.

In Figs. 6 and 7 the tenon designated generally 31 as shown in Fig. 7 consists of a cylindrical metal member 32 having a bore 33 extending throughout its length and threaded as at 34 for engagement with the threads 21 of the stem 17. The outer end of this member 32 is enlarged as at 35 being tapered along the neck portion 36. The bead or washer 27 has fixed to it a sleeve 37 split as at 38 so that as the member 34 is threaded into the bore 20 this split sleeve 37 will be expanded by the tapered portion 36. In use when it is desired to release the pipe stem from the bore 16 after turning the stem portion 17 it is necessary to push the stem portion inwardly so as to permit the split sleeve 37 to be moved to the smaller part of the member 32 and be returned inwardly to its released position.

We claim:

1. A stem for a tobacco pipe having a bore therein, wherein said stem has a central axial bore therethrough, said stem bore being threaded at one end, a tubular member having a shoulder thereon intermediate the ends and threads on said member extending from said shoulder to one end thereof and engaging the threads on the stem, a washer freely rotatably and slidably mounted on said tubular member on the side of said shoulder opposite from the threaded portion and adapted to abut said shoulder, a diametrically expansible sleeve on the same side of the shoulder and adapted to engage the device bore and extending along said tubular member and engageable by said washer, and means at the opposite end portion of said member responsive to movement toward the washer for expanding the diameter of said sleeve whereby holding of the member stationary by the engagement of the washer with the sleeve or member and rotating the stem relative to the member will cause lateral expansion of the sleeve to maintain the stem in fixed relation to the bore of the device.

2. A stem for a tobacco pipe having a bore therein, wherein said stem has a central axial bore therethrough, said stem bore being threaded at one end, a tubular member having a shoulder thereon intermediate the ends and threads on said member extending from said shoulder to one end thereof and engaging the threads on the stem, a washer freely rotatably and slidably mounted on said tubular member on the side of said shoulder opposite from the threaded portion and adapted to abut said shoulder, an abutment at the opposite end of the member and an elastic sleeve adapted to engage the device bore extending along said tubular member between said abutment and said washer and longitudinally compressible to expand its diameter by threading said member into the bore whereby holding of the member stationary by the engagement of the washer with the sleeve or member and rotating the stem relative to the member will cause longitudinal compression and lateral expansion of the sleeve to maintain the stem in fixed relation to the bore of the device.

ARMAND DAIGNAULT.
ALFRED NOLET.